US008091033B2

(12) United States Patent  
von Sichart et al.

(10) Patent No.: US 8,091,033 B2
(45) Date of Patent: Jan. 3, 2012

(54) SYSTEM FOR DISPLAYING SEARCH RESULTS ALONG A TIMELINE

(75) Inventors: Johannes von Sichart, San Jose, CA (US); Cordell R. Ratzlaff, Palo Alto, CA (US); Ruben Rohde, Alameda, CA (US)

(73) Assignee: Cisco Technology, Inc., San Jose, CA (US)

( * ) Notice: Subject to any disclaimer, the term of this patent is extended or adjusted under 35 U.S.C. 154(b) by 928 days.

(21) Appl. No.: 12/099,552

(22) Filed: Apr. 8, 2008

(65) Prior Publication Data

US 2009/0254825 A1 Oct. 8, 2009

(51) Int. Cl.
*G06F 3/00* (2006.01)
(52) U.S. Cl. ...................................................... 715/751
(58) Field of Classification Search .................. 715/772, 715/833, 838, 751, 753
See application file for complete search history.

(56) References Cited

U.S. PATENT DOCUMENTS

| | | | | |
|---|---|---|---|---|
| 5,446,895 | A | 8/1995 | White et al. | 395/650 |
| 7,680,360 | B2 * | 3/2010 | Nagamine et al. | 382/305 |
| 2004/0066414 | A1 | 4/2004 | Czerwinski et al. | 345/781 |
| 2008/0034307 | A1 * | 2/2008 | Cisler et al. | 715/764 |
| 2008/0082578 | A1 * | 4/2008 | Hogue et al. | 707/104.1 |
| 2008/0209417 | A1 * | 8/2008 | Jakobson | 718/100 |
| 2009/0252312 | A1 | 10/2009 | Muniz et al. | 379/112.01 |
| 2009/0254608 | A1 | 10/2009 | Butt et al. | 709/203 |
| 2010/0088247 | A1 * | 4/2010 | Allin et al. | 705/344 |

OTHER PUBLICATIONS www.apple.com, Apple—Time Machine, Apr. 2, 2008.
www.finance.google.com, Finance Google, Mar. 28, 2008.
Ward, Rod, Oracle® interMedia User's Guide, 10g Release 1(10.1), Part No. B10840-01, Dec. 2003.
www.xobni.com, Xobni, Apr. 25, 2008, 2 pgs.

* cited by examiner

*Primary Examiner* — Thanh Vu
(74) *Attorney, Agent, or Firm* — Brinks Hofer Gilson & Lione

(57) ABSTRACT

In one embodiment, an apparatus may receive search results from a database. The search results may be from a search request that requests database entries associated with a project. The apparatus may display a timeline, where the timeline includes display regions that correspond to time periods. The apparatus may display a visual indicator in one of the display regions that corresponds to a given time period. The visual indicator may correspond to a result item included in the search results. The result item may be associated with a date, and the date is in the given time period. The apparatus may retrieve information from the database, where the information is limited to data stored in the database as of the date. The apparatus may display the information in addition to the timeline on a display. The information may include data other than the result item.

18 Claims, 3 Drawing Sheets

SYSTEM FOR DISPLAYING SEARCH RESULTS ALONG A TIMELINE

BACKGROUND

The present disclosure relates generally to user interfaces.

Project management software may track project milestones. Office suite software may track items such as e-mails, appointments, and tasks. The office suite software may include a page that displays a preview of a user's day. From the preview, the user may see, for example, a summary of the user's appointments, the user's task list, and the number of new e-mail messages in the user's inbox. The user may use the project management software and the office suite software to examine details of the currently tracked items.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DESCRIPTION OF EXAMPLE EMBODIMENTS

Overview

Figure 1:
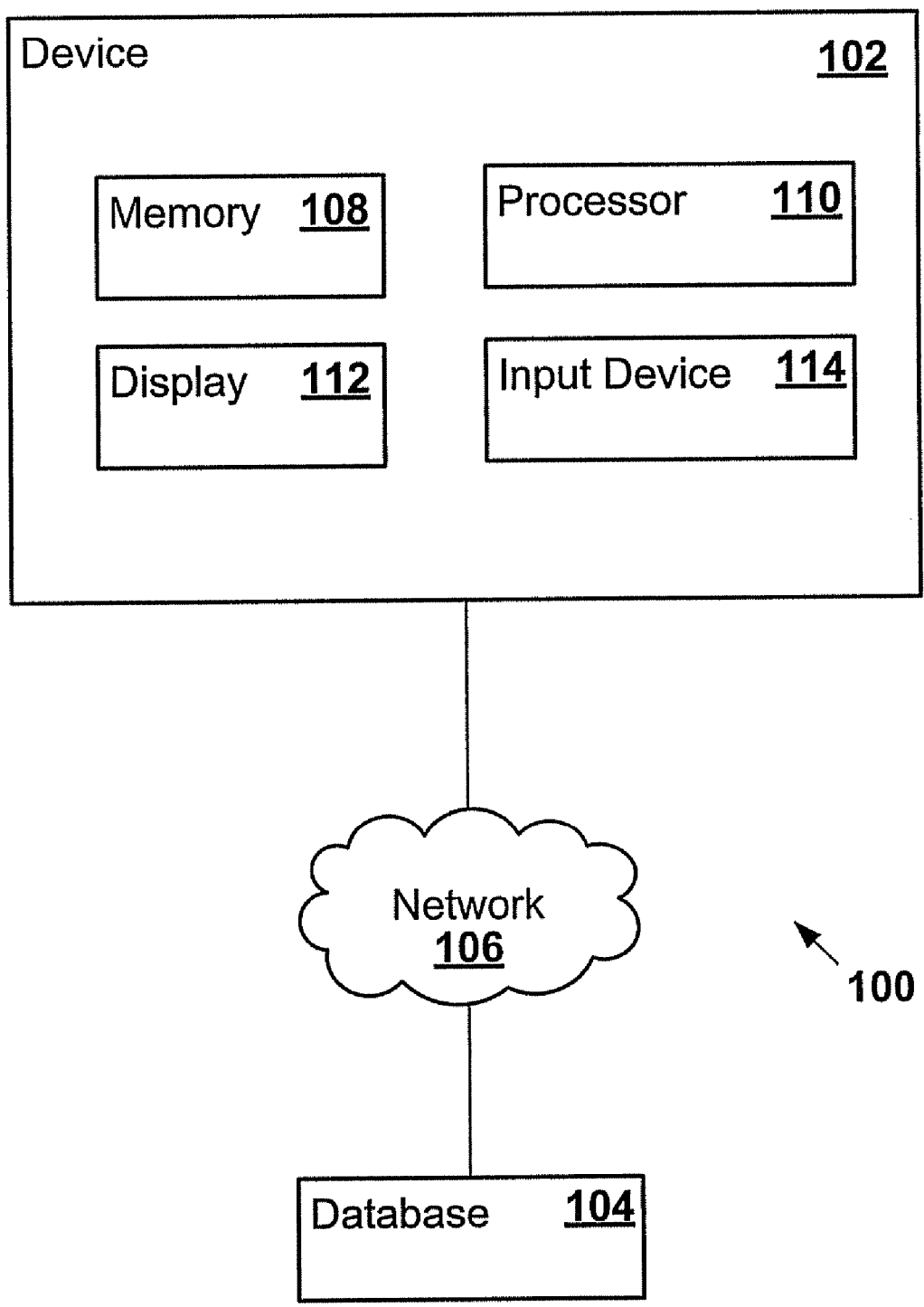
FIG. 1 illustrates one embodiment of a system for displaying search results along a timeline.

By way of introduction, the example embodiments described below include an apparatus, logic encoded in a tangible media, and a method for displaying search results along a timeline.

According to a first embodiment, an apparatus is provided. In one embodiment, an apparatus may receive search results from a database. The search results may be from a search request that requests database entries associated with a project. The apparatus may display a timeline. The timeline may include display regions that correspond to time periods. The apparatus may display a visual indicator in one of the display regions that corresponds to a given time period. The visual indicator may correspond to a result item included in the search results. The result item may be associated with a date, and the date is in the given time period. The apparatus may retrieve information from the database. The apparatus may display the information, limited to data stored in the database as of the date, in addition to the timeline on a display. The information may include data other than the result item.

In a second embodiment, logic encoded in a tangible media is provided. The logic when executed is operable to display a substantially linear timeline. The timeline represents a time period. The logic when executed is operable to receive search results from a database. The database may include information associated with a project. The logic when executed is also operable to position a visual indicator along the timeline. The visual indicator corresponds to a result item included in the search results. The result item is associated with a date. A percentage of the time period has elapsed as of the date. The visual indicator is positioned at an offset from a start of the timeline by the percentage of a length of the timeline. The logic when executed is further operable to retrieve information from the database, where the information is limited to data stored in the database as of the date. The logic when executed is even further operable to display the information in addition to the timeline on a display. The information includes data other than the result item.

In a third embodiment, a method is provided. A timeline is displayed that includes a plurality of display regions. The display regions correspond to respective time periods. Search results are received from a database. A visual indicator is displayed in one of the display regions that corresponds to a time period. The visual indicator corresponds to a result item included in the search results. The result item is associated with a date. The date is in the time period. Information is retrieved from the database. The information is limited to data stored in the database as of the date. The information is displayed in addition to the timeline on a display. The information includes data other than the result item.

The present invention is defined by the following claims, and nothing in this section should be taken as a limitation on those claims. Further aspects and advantages of the invention are discussed below in conjunction with the example embodiments.

Example Embodiments

A system for displaying search results along a timeline may include any device or devices operable to generate a user interface. A user interface permits a user to manipulate the system and permits the system to produce the effects of the user's manipulation. The search results may be received from a database. The search may be of information associated in some way with a project. A project is a collaborative enterprise that is planned to achieve a particular goal or set of goals. For example, the goal or set of goals of a project are associated with the project. An example of a goal may be to complete the design of a new product. Communications such as e-mails, phone calls, conference calls, and meetings that contain information relating to the project may also be associated with the project. Visual indicators of the search results may be displayed along the timeline. The visual indicators may indicate at what point in time each result item in the search result occurred or is scheduled to occur. Information may also be displayed, where the information is retrieved from the database and is limited to data stored in the database as of a particular date.

FIG. 1 illustrates one embodiment of a system 100 for displaying search results along a timeline. The system 100 may include a device 102, a database 104, and a network 106 connecting the device 102 with the database 104. The system 100 may include additional, different, or fewer components. For example, the system 100 may not include the network 106, and the device 102 may include the database 104. In another example, the system 100 may additionally include one or more server computers (not shown) connected to the network 106. The server computers may include a web server and/or the database 104. The network 106 may be a Local Area Network (LAN), a Wireless Local Area Network (WLAN), a Personal Area Network (PAN), a Wide Area Network (WAN), or any other now know or later developed communications network.

The device 102 may be any device or devices operable to generate a user interface. For example, the device may be a mobile device, mobile phone, laptop computer, notebook computer, Personal Digital Assistant (PDA), desktop computer, or server computer.

The device 102 may include a memory 108, a processor 110, a display 112, and an input device 114. The device 102 may include additional, different, or fewer components.

The memory 108 may be any now known, or later discovered, storage device. The memory 108 may be a non-volatile and/or volatile memory, such as a random access memory (RAM), a read-only memory (ROM), an erasable programmable read-only memory (EPROM), or flash memory. The memory 108 may include an optical, magnetic (hard-drive) or other memory device.

The processor 110 may be in communication with the memory 108. The processor 110 may also be in communication with additional components, such as the display 112 and the input device 114. The processor 110 may be a general processor, central processing unit, server, application specific integrated circuit (ASIC), digital signal processor, field programmable gate array (FPGA), digital circuit, analog circuit, or combinations thereof. The processor 110 may be one or more processors or devices operable to generate a user interface on the display 112.

The display 112 may be any electro-optical device for displaying data, such as a liquid crystal display (LCD), a cathode ray tube (CRT), an electro-luminescent display, a plasma display panel (PDP), a vacuum florescent display (VFD), or other display device. The input device 114 may be a wheel button, a joystick, a keypad, a touch-screen configuration or any other device or mechanism capable of receiving an input from a user and providing such an input as an input signal.

The database 104 may be a memory with any electronic collection of information. For example, the database 104 includes information that is organized so that the information may be accessed, searched, managed, and updated, such as a Relational Database Management System (RDBMS), an object-oriented database, an extensible markup language (XML) database, a file system, memory structures, or other now known or later developed database. The database 104 may use any type of memory and structure, such as a random access memory (RAM), a read-only memory (ROM), an erasable programmable read-only memory (EPROM), flash memory, optical memory, magnetic (hard-drive or tape) memory or other memory device.

The database 104 may include database entries. A database entry is information that may be retrieved from or stored in the database 104. The database entry may be accessed or looked-up using a unique key, such as a primary key value, a full path name, or a memory address. For example, the database entry may be a row in a table in an RDBMS. In other examples, the database entry may be stored across multiple locations in the database 104, such as across multiple tables in an RDBMS. A table in an RDBMS may include one or more columns. The database 104 may include a collection of databases.

The database 104 may include different types of database entries, such as entries containing e-mails, entries containing appointments, entries containing project information, entries containing voice mails, and entries containing tasks included in task lists. The database 104 may include additional, different, or fewer database entries. One or more database entries may be associated in the database 104 with one or more other database entries. For example, tasks may be associated with a project, and emails and voice mails may be associated with a user name.

Any method of associating database entries in a database 104, now known or later discovered, may be used. In some examples, a first database entry is associated with a second database entry by including a unique key in the second database entry to identify the first database entry. In other examples, the first database entry is associated with the second database entry by including a unique key in the first database entry to identify the second database entry. In still other examples, the database 104 includes an association database entry, where the association database entry includes a unique key to indentify the first database entry and a unique key to identify the second database entry. A database entry may be associated with a value by including the value.

The database 102 may include database entries that are associated with dates. Any type of database entry may be associated with dates. For example, an e-mail may have been sent on a given date. The database 104 may include an e-mail database entry that corresponds to the e-mail. The e-mail database entry may be associated with the given date. Additionally, a meeting may have been or be planned to be held on the given date. The database 104 may include a meeting database entry corresponding to the meeting. The meeting database entry may also be associated with the given date. The database 102 may include database entries corresponding to any type of data, such as a the kinds of data traditionally stored in a Customer Relationship Management (CRM) database, a real-time communications log, electronic or real-world file usage history, or locations visited.

A date, which represents a point in time, may have any degree of accuracy supported by the database 104. For example, a date may be accurate to the nearest day, hour, minute, second, millisecond, or other increment of time.

During operation, the device 102 may store database entries in the database 104 and retrieve database entries from the database 104. To retrieve database entries, the device 102 may transmit a search request to the database 104. A search request may be any query to retrieve data from a database now know or later discovered, such as one written in Structured Query Language (SQL) or an XML Path Language (XPath) expression. In response to receipt of the search request, the database 104 may transmit search results to the device 102. The search results may include result items. A result item may correspond to one or more database entries. For example, if a search request is for any e-mail associated with a given project, each of the result items may be an e-mail associated with the given project. Each of the result items may correspond to an e-mail database entry.

The database 104 may be populated with database entries by any means now known or later discovered. For example, the data could be bulk-loaded, manually entered by a user, and/or automatically generated in response to the user's input.

Figure 2:
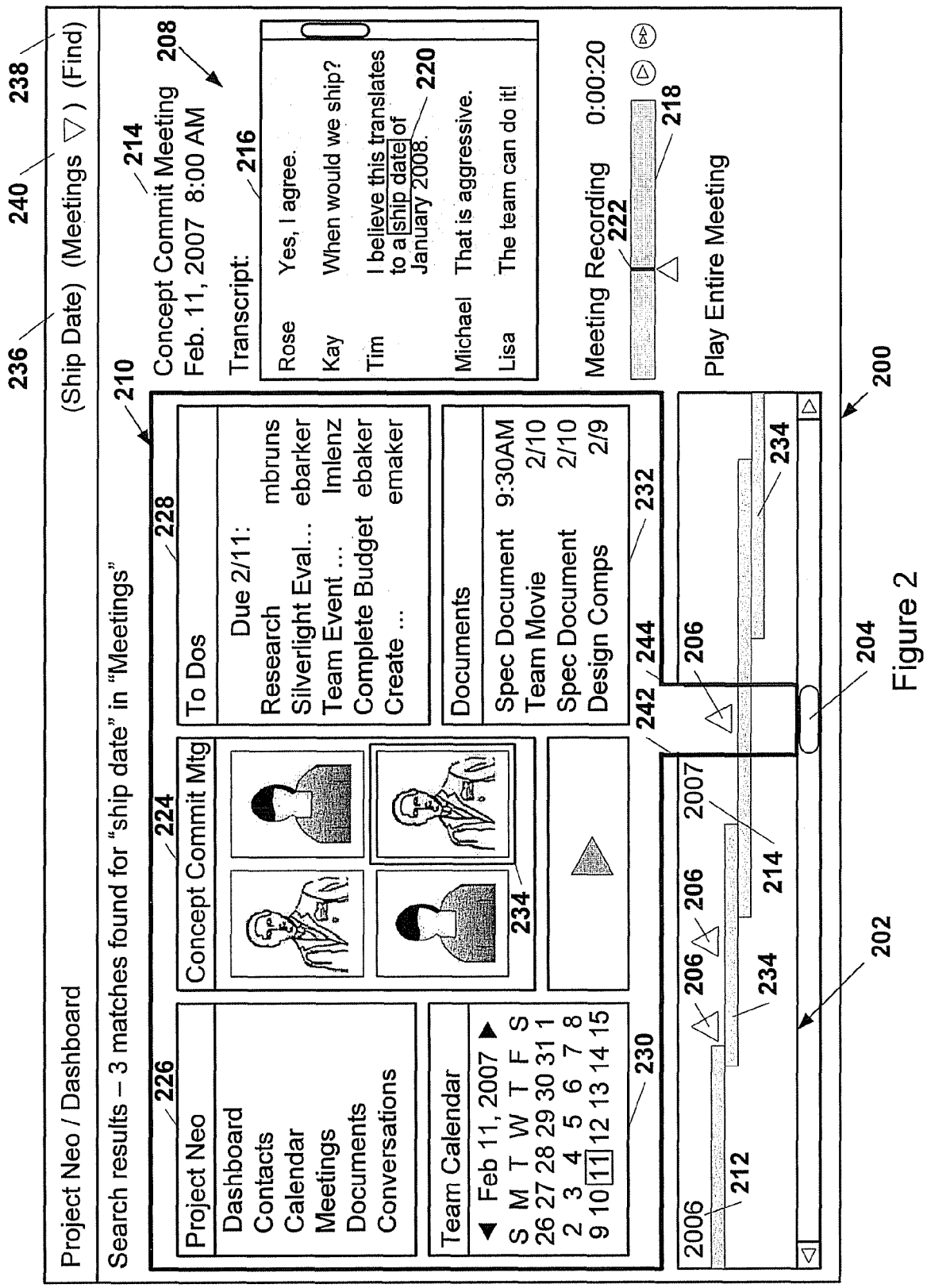
FIG. 2 illustrates an example graphical user interface generated by the system of FIG. 1.

FIG. 2 illustrates an example display screen 200 generated by the system 100 of FIG. 1 or a different system. For example, the device 102 of the system 100 of FIG. 1 generates the display screen 200 in response to receipt of search results.

In this example, the database 104 transmits the search results to the device 102 in response to receipt of a search request. The search request is a search of meetings for the keywords "ship date," where the meetings are associated with a project called "Neo." The search results include three result items, which are meetings. Each of the three meetings took place on a different date.

The display screen 200 may include a timeline 202, a time selector 204, visual indicators 206, a result item viewer 208, and a snapshot window 210. The display screen 200 may include additional, different, or fewer user interface components.

The timeline 202 may include a plurality of display regions, 212 and 214. Each of the display regions, 212 and 214, may correspond to a time period. The display regions, 212 and 214, may or may not be visually marked. In one example, the timeline may be substantially linear. In another example, the timeline may include contiguous time segments arranged in chronological order, such as a calendar or a collection of calendars.

The display screen 200 may include visual indicators 206 corresponding to each of the result items included in the search results. Result items may be of any data type and be associated with a date. The visual indicator 206 used may be any symbol, word, phrase, character, or other indicator. In some examples, the visual indicator 206 used may vary based on the data type of a corresponding result item. For example, a triangle might be used for a meeting object and a square for a task object. When a user positions a cursor over a visual indicator 206, the device 102 may display information about the result item corresponding to the visual indicator 206. The information about the result item may include, for example, the exact date and/or time the result item occurred or is planned to occur, the type of result item, a title of the result item, and/or any other information about the result item.

The device 102 may position the visual indicator 206 of the corresponding result item along the timeline 202 based on the date associated with the result item. If the date is not included in one of the time periods, 212 or 214 of the timeline 202, the device 102 may not display the visual indicator 206 corresponding to the result item. If the date is included in a time period, 212 or 214, of the timeline 202, the device 102 may position the visual indicator 206 in the display region, 212 or 214, that corresponds to the time period. In substantially linear timeline examples, if a percentage of the time period has elapsed as of the date, the device 102 may position the visual indicator 206 along the timeline offset from a start of the timeline 202 by the percentage of the length of the display region, 212 or 214. When the device 102 displays the visual indicators 206 along the timeline 202, each of the visual indicators 206 may be included in the timeline 202, proximate to the timeline 202, and/or aligned with the appropriate position on the timeline 202. The visual indicators 206 may not be equidistant from each other on the display, because the position of each of the visual indicators 206 on the display is based on the date associated with each of the result items corresponding to the visual indicators 206. Because the data associated with a result item may be the date that an event corresponding to the result item occurred, the positions of the visual indicator 206 relative to the timeline 202 may provide a temporal context of the event corresponding to the result item.

In addition to the timeline 202 and the visual indicators 206, the display screen 200 may include a time selector 204. The time selector 204 may be any user input control or collection of user input controls operable to receive a selection signal from the input device 114, where the selection signal indicates a user's selection of a given date on the timeline 202. For example, the time selector 204 may be a list box, a combo box, a collection of buttons, or a thumb of a scrollbar and/or arrows of a scrollbar.

If the date selected with the time selector 204 is the same date that is associated with a result item, then the device 102 may display the result item or a portion of the result item with a result item viewer 208. The result item viewer 208 may be any control or collection of controls configured to display a type of object corresponding to the result item. The result item viewer 208 may include a link, button, hyperlink or other reference link to such a control. In FIG. 2, the result item viewer 208 is operable to display a portion of a meeting object. The result item viewer 208 displays the date and title 214 of the meeting and a portion of a transcript 216 of the meeting. The result item viewer 208 also includes a control 218 to play an audio recording of the meeting.

The result item viewer 208 may also identify keywords found within a result item. For example, the keywords may be underlined, highlighted, boxed, enlarged, or otherwise emphasized. In FIG. 2, the result item viewer 208 identifies the keywords within the transcript by boxing 220 the keywords. In FIG. 2, the result item viewer 208 also identifies where the keywords were spoken in the audio recording with a vertical line 222. The result item viewer 208 may be configured to initially display the portion of the result item that includes the first occurrence of the keyword or keywords included in the search request.

As mentioned above, the display screen 200 may include the snapshot window 210 in addition to the timeline 202, the time selector 204, the visual indicators 206, and the result item viewer 208. The snapshot window 210 may provide an interactive view of data retrieved from the database 104 as the data would have appeared on a selected date. The selected date may be the date selected by the time selector 204. The device 102 may merely display data associated with the selected date. Alternatively, the device 102 may display data as the data was stored in the database 104 as of the selected date. For example a meeting may have been scheduled for a day after the selected date and not be associated with the selected date. However, data about that meeting may have been stored in the database 104 as of the selected date.

The snapshot window 210 may provide an interactive view by including one or more user input controls, 224, 226, 228, 230 and 232, to browse or search the data. Examples of such user input controls include a meeting viewer control 224, a project browser control 226, a project task list control 228, a calendar control 230, and file browser control 232. The user input controls may be any user input controls including standard controls, such as text fields, radio buttons, and grid controls.

In some examples, the device 102 may permit modification of the data through the snapshot window 210. In other examples, the device 102 may not permit modification of the data through the snapshot window 210.

In addition to or instead of the result item viewer 208, the device 102 may display the result item or a portion of the result item within the snapshot window 210 using a second result item viewer 224. The second result item viewer 224 may be the same or different from the first 208. In FIG. 2, a portion of the result item is displayed in the meeting viewer control 224. In this example, the second meeting viewer control 224 displays thumbnail images of the meeting participants. The second meeting viewer control 224 may use a visual cue 234 to indicate which of the meeting participants spoke the keyword identified in the first result item viewer 208. For example, the visual cue 234 may be a highlight of the image, a speech bubble, and/or enlargement of the speaker's image. The device 102 may keep the position within the result item of first result item viewer 208 synchronized with the position within the result item of the second result item viewer 208. In other words, the first result item viewer 208 may be linked with the second result item viewer 208.

In other examples, the device 102 may not display the result item or a portion of the result item within the snapshot window 210. In still other examples, the device 102 may merely display a portion of the result item, such as a title of the result item. The device 102 may display a visual cue to distinguish the portion of the result item from other data displayed in the snapshot window 210. For example, the visual cue may include highlighting, italicizing, boxing, or including an arrow pointing to the portion of the result item. In still other examples, the device 102 may only display the result item or a portion of the result item within the snapshot window 210.

In one example, the database 104 may include communication data and project data, such as e-mails, phone calls, recordings of phone calls, conference calls, recordings of conference calls, meetings, audio recordings of meetings, instant messages, project phases, project milestones, tasks, task lists, project documents, and project metadata. The communication data may be associated with one or more projects. The different types of communication data may be associated with a planned date of occurrence and/or a date of occurrence. A project is a collaborative enterprise that is planned to achieve a particular goal or set of goals. The project may be a temporary enterprise or an on-going enterprise. The project may or may not have team members. The snapshot window 210 may be a dashboard or portal for viewing data associated with a project as the portal would have looked as of the selected date. The portal provides a unified access point and is designed to aggregate and personalize information through application-specific portlets, 224, 226, 228, 230, and 232. For example, in FIG. 2, the selected date is Feb. 11, 2007. A team calendar portlet 230 indicates that the snapshot in time is the selected date. A task list portlet 228 displays tasks due on the selected date, where the tasks were specific to the project and the assignees are involved with the project. A file browsing portlet 232 displays project related files that are available for browsing as of the selected date. Thus, the portal provides a unified way to access different types of communication data and project data related to the project.

The device 102 may display project phases 234 on the timeline 202. Details of the project phases 234, such as start and end dates, may be retrieved from the database 104. The end dates may represent milestones in the project. The project phases 234 provide a temporal context for result items corresponding to the visual indicators 206.

Any method of entering a search now known or later discovered may be used to initiate a search request. For example, a user may initiate a search request by entering keywords into a text field 236 and selecting a find button 238. Additional conditions may optionally be included in the search request by using a list box 240 to select the data type of desired result items.

When searching communication data, it may be desirable to add a condition to the search request in order to limit the search results to those containing keywords spoken or written by a given person. Any method of entering a condition to a search now known or later discovered may be used. For example, a user may optional identify a speaker by selecting the speaker from a list of speakers using a list box.

In some examples, a user may vary the level of detail shown in the snapshot window 210. For example, the user may drag a first adjustment handle 242 and/or a second adjustment handle 244 away from the other, increasing a time span of interest. The user may also drag the first adjustment handle 242 and/or the second adjustment handle 244 toward each other, decreasing the time span of interest. If the time span of interest is less than a determined amount, then the device 102 may display detailed information about the selected date. If the time span of interest is more than the determined amount, then the device 102 may display an overview of the information. The time span of interest may be selected using any method for making adjustments, such as with a scrollbar, a list box, a check box, or clicking. The determined amount may be configured by the user or configured at a system level based on the scale of the timeline 202 or other factor.

Figure 3:
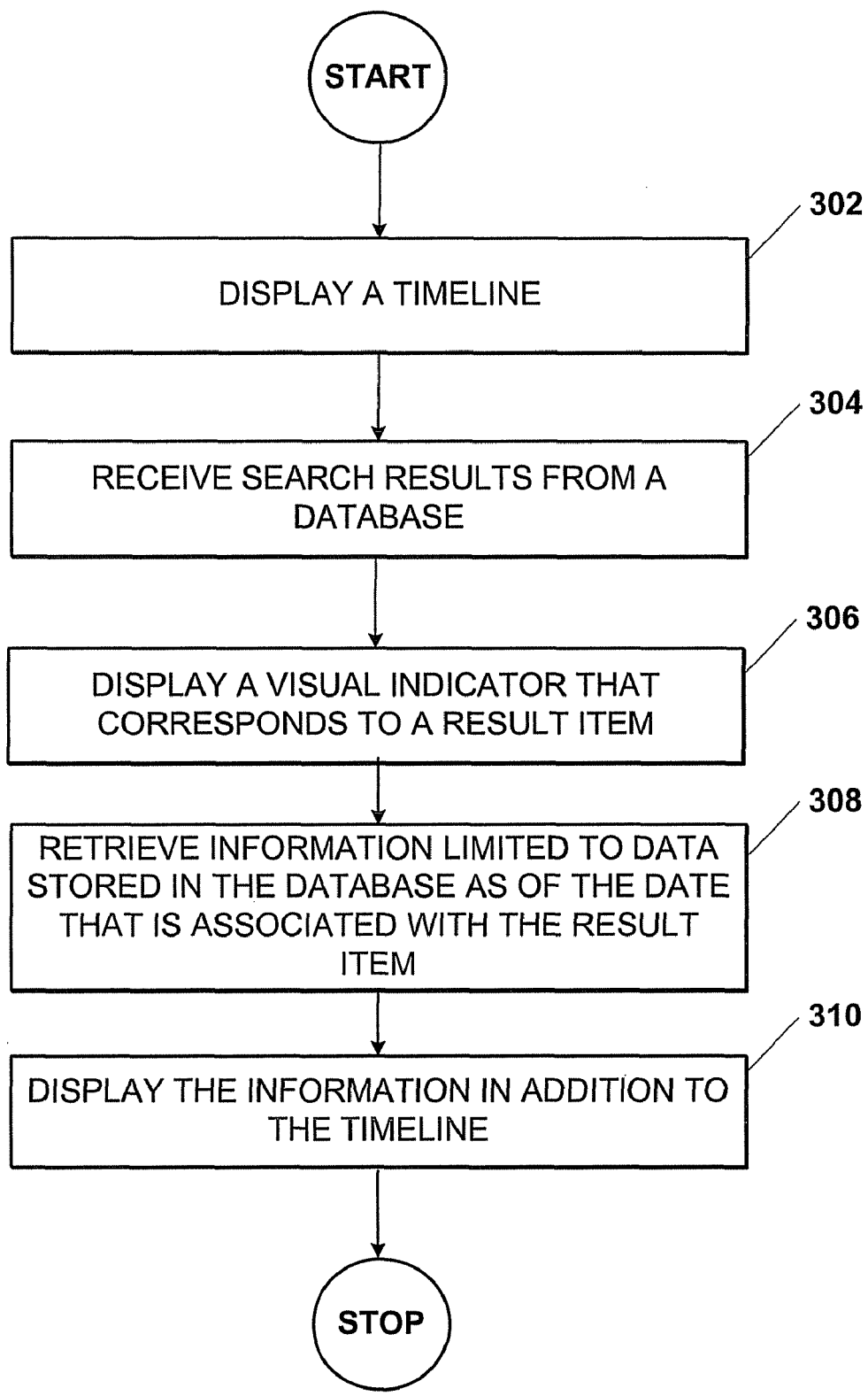
FIG. 3 illustrates one embodiment of a method included in a system for displaying search results along a timeline.

FIG. 3 illustrates one embodiment of a method included in a system for displaying search results along a timeline. Additional, different, or fewer acts may be performed. The acts do not need to be performed in the ordered shown in FIG. 3. In act 302 of the embodiment illustrated in FIG. 3, the operation may begin by displaying a timeline that includes display regions, where each of the display regions corresponds to respective time periods.

In act 304, search results may be received from a database. In act 306, a visual indicator may be displayed in one of the display regions that corresponds to a time period. The visual indicator may correspond to a result item included in the search results. The result item may be associated with a date. The date may be in the time period.

In act 308, information may be retrieved from the database where the information is limited to data stored in the database as of the date. Alternatively, the display is limited to information as of the date. In other embodiments, the retrieved and/or displayed information is not limited to data as of the date. At act 310, the information may be displayed in addition to the timeline on a display. The information may include data other than the result item.

Different components provide different functions for displaying search results along a timeline. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. An apparatus comprising:
a memory; and
a processor operable to:
receive search results from a database in response to a search request for database entries associated with a project, the project representing a collaborative enterprise planned to achieve at least one goal through completion of a plurality of tasks, the database entries include including communication data and project data, the communication data comprising recordings of meetings associated with the project, the project data comprising the tasks and a plurality of project documents;

generate a timeline, wherein the timeline includes a plurality of display regions and each of the display regions corresponds to a respective one of a plurality of time periods;

generate a visual indicator in one of the display regions, wherein the visual indicator corresponds to a result item included in the search results, a date is associated with the result item, the one of the display regions corresponds to one of the time periods, and the date is in the one of the time periods;

retrieve project information for a snapshot window from the database entries, the snapshot window comprising a view of the project data and the communication data as the project data and the communication data were stored in the database as of the date associated with the result item, the view of the project data including information about the tasks; and generate the snapshot window and the timeline on a display.

2. The apparatus of claim 1 wherein the processor is further operable to:

generate at least a portion of the result item on the snapshot window; and generate a visual cue on the snapshot window that distinguishes the at least a portion of the result item from the rest of the project data and the communication data.

3. The apparatus of claim 1 wherein the processor is further operable to:

generate at least one user input control on the snapshot window; and generate additional data on the snapshot window in response to a user selection of the at least one user input control, wherein the additional data includes data stored in the database as of the date.

4. The apparatus of claim 1 wherein the processor is further operable to:

generate a portion of the result item on the snapshot window, the portion including a keyword, wherein the search request included the keyword.

5. The apparatus of claim 4 wherein the result item is a recorded meeting and the processor is further operable to:

generate a visual cue in the snapshot window that identifies a meeting participant who spoke the keyword in the recorded meeting.

6. The apparatus of claim 1 wherein the visual indicator depends on a data type of the result item.

7. The apparatus of claim 1 wherein the search request includes a keyword and an identified person, the search request is of a plurality of meetings associated with the project, and the keyword was spoken by the identified person in each of the meetings.

8. The apparatus of claim 1 wherein the processor is further operable to:

generate project phases of the project on the snapshot window, wherein the project phases are positioned along the timeline.

9. Logic encoded in one or more tangible media for execution and when executed operable to:

generate a timeline, the timeline representing a time period;

receive search results from a database in response to a request for information associated with a project, wherein the project represents a collaborative enterprise planned to achieve at least one goal through completion of a plurality of tasks;

position a visual indicator along the timeline, wherein the visual indicator corresponds to a result item included in the search results, a date is associated with the result item, a percentage of the time period has elapsed as of the date, the visual indicator is positioned at an offset from a start of the timeline by the percentage of a length of the timeline;

retrieve project information for a snapshot window from the database, wherein the project information is limited to data stored in the database as of the date, the project information comprising information about communication data and project data, the communication data comprising recordings of meetings associated with the project, the project data comprising the tasks and a plurality of project documents; and generate the snapshot window and the timeline on a display, wherein the project information includes data in addition to the result item.

10. A method comprising:

displaying a timeline, wherein the timeline includes a plurality of display regions and each of the display regions corresponds to a respective one of a plurality of time periods;

receiving search results from a database, the search results associated with a project in the database, the project representing a collaborative enterprise planned to achieve at least one goal through completion of a plurality of tasks;

displaying a visual indicator in one of the display regions, wherein the visual indicator corresponds to a result item included in the search results, a date is associated with the result item, and the date is in one of the time periods corresponding to the one of the display regions;

retrieving project information from the database, the project information comprising information about communication data and project data associated with the project, the communication data comprising recordings of meetings associated with the project, the project data comprising the tasks and a plurality of project documents, wherein the project information is limited to data stored in the database as of the date; and displaying the project information in addition to the timeline on a display, wherein the information includes data other than the result item.

11. The method of claim 10 further comprising:

decreasing a level of detail of the project information displayed in response to increasing a time span of interest by adjustment of a user input control.

12. The method of claim 10 further comprising:

modifying the date in response to a user selection of a time selector; and re-retrieving and re-displaying the project information in response to modifying the date.

13. The method of claim 10 further comprising:

displaying at least a portion of the result item in a first result item viewer and a second result item viewer; and synchronizing a position within the first result item viewer with a position within the second result item viewer.

14. The method of claim 10 wherein the search results are received in response to transmission of a search request and the search request is for the communication data.

15. The method of claim 10 wherein the date indicates when a communication object corresponding to the result item occurred.

16. The method of claim 10, wherein the communication data further comprises e-mails.

17. The method of claim 10, wherein the communication data further comprises recordings of phone calls.

18. The method of claim 10, wherein the communication data further comprises instant messages.

* * * * *